Figure 1:
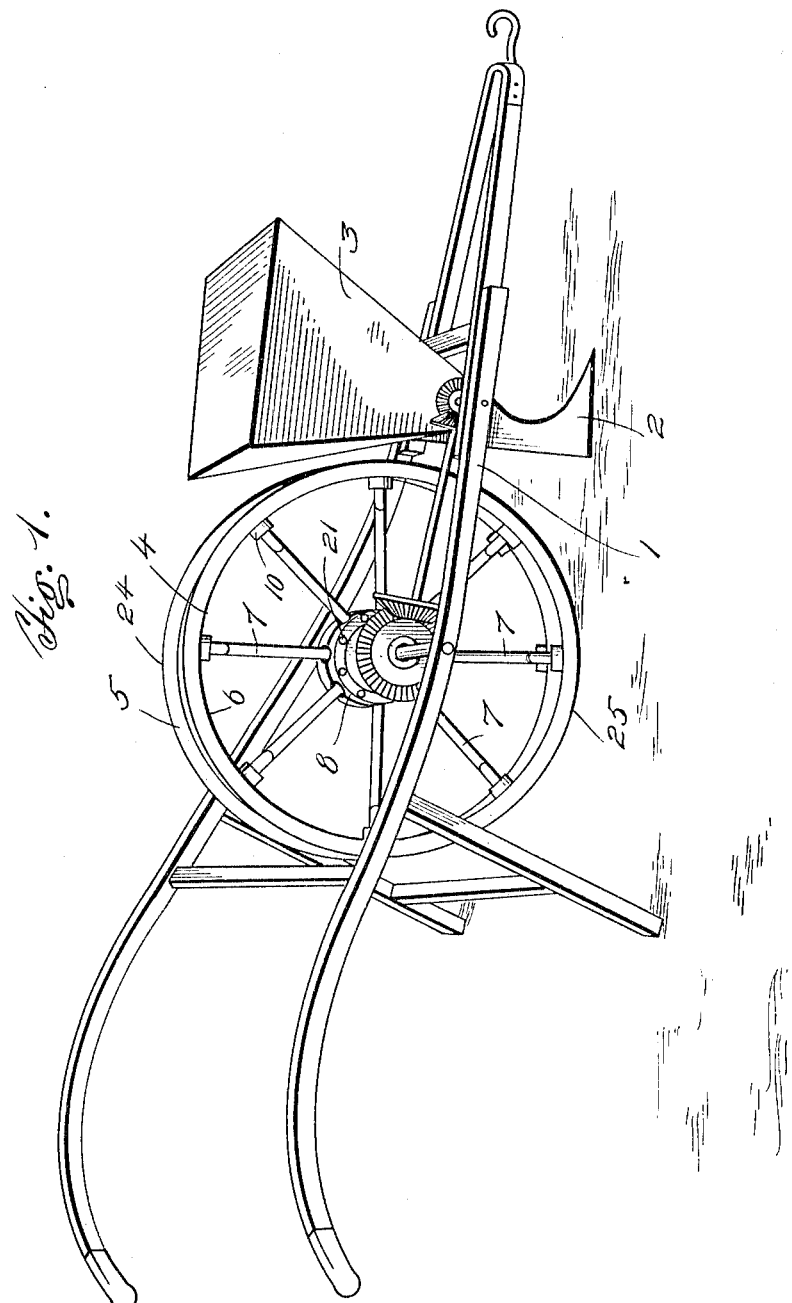

J. M. JEFFERIS.
CORN PLANTER.
APPLICATION FILED OCT. 19, 1912.

1,105,665.

Patented Aug. 4, 1914.
2 SHEETS—SHEET 1.

WITNESSES
M. P. McKee
O. Hook

INVENTOR
J. M. Jefferis
Alex. J. Wedderburn, Jr. Attorney

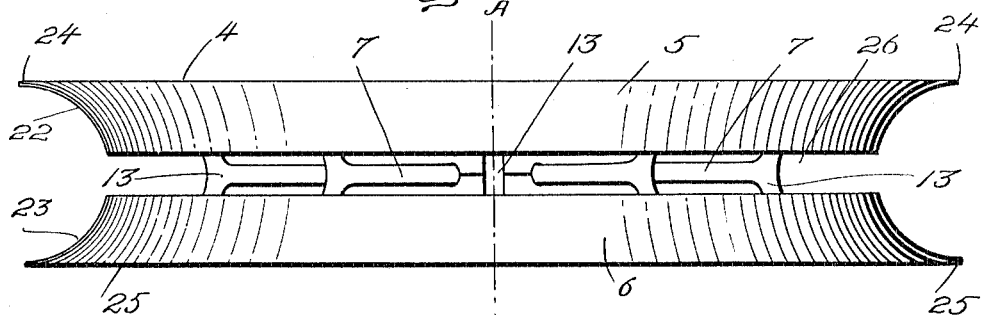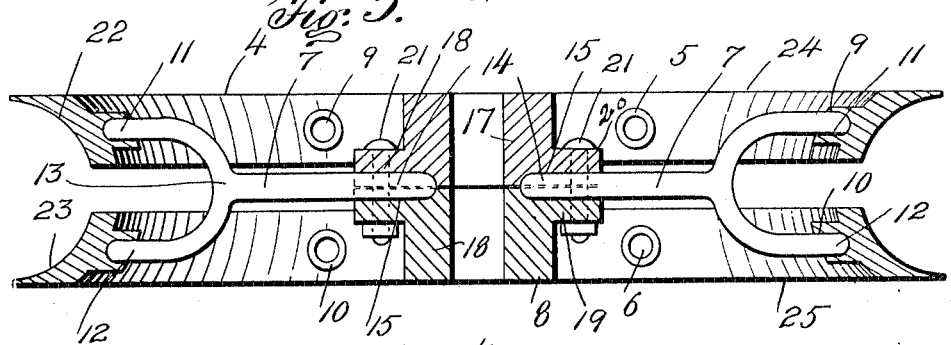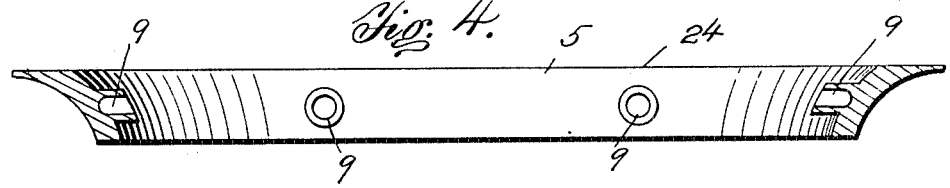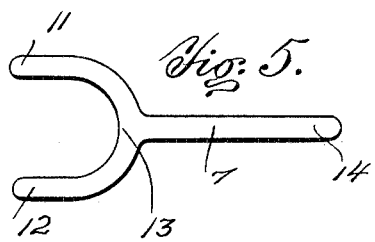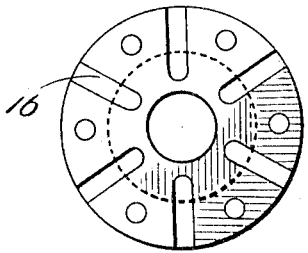

UNITED STATES PATENT OFFICE.

JOSHUA M. JEFFERIS, OF WILMINGTON, OHIO.

CORN-PLANTER.

1,105,665.  Specification of Letters Patent.  Patented Aug. 4, 1914.

Application filed October 19, 1912. Serial No. 726,748.

*To all whom it may concern:*

Be it known that I, JOSHUA M. JEFFERIS, a citizen of the United States, residing at Wilmington, in the county of Clinton and State of Ohio, have invented certain new and useful Improvements in Corn-Planters, of which the following is a specification.

This invention relates to improvements in corn planters, and has for its object to provide means for covering corn after it has been dropped into its row.

Another object of the invention is to provide a split wheel so constructed as to cover a corn row without causing the corn grains to come out of the ground.

With the above and other objects in view I have invented the device illustrated in the accompanying drawings in which—

Figure 1 is a perspective view of my improved corn planter, Fig. 2 is a top plan view of a seed covering wheel, Fig. 3 is a section on line A—A of Fig. 2, Fig. 4 is a sectional view of a wheel rim, Fig. 5 is a detail view of a spoke, and Fig. 6 is a detail view of a hub member.

Like reference characters indicate like parts in the specification and in the several views in the drawings in which—

Fig. 1 illustrates a corn or other seed planter comprising a frame 1 carrying a plow 2, a seed box 3 and a covering wheel 4, said wheel consisting of a pair of spaced apart rim members 5 and 6, spokes 7 and a hub 8. The members 5 and 6 are provided with opposingly arranged sockets 9 and 10 on their inner surfaces which are adapted to receive the arms 11 and 12 of the U-shaped ends 13 of the spokes 7, the inner ends 14 which are adapted to seat in the sockets 15 formed by the opposing recesses 16 in the abutting hub members 17 and 18, having flanges 19 and 20 adapted to be held together by bolts 21. The rims 5 and 6 are provided with arcuate surfaces 22 and 23 whereby the outer surface of the wheel is formed semicylindrical, whereby the extreme outer edges 24 and 25 which are adapted to cut down into the earth on both sides of a seed row and by means of the arcuate form of the rims force the earth centerward over the seed row. The open space 26 in the center of the rim coming directly over the seed row prevents packing the earth upon the seed.

It will be readily understood that I do not limit the use of my invention to the exact construction of planters shown, as it may be used to advantage on planters of various constructions.

Having described my invention that which I claim to be new and desire to procure by Letters Patent is:

A device of the character described comprising two circular members having each a concave periphery terminating in a tapered edge, two hubs, each hub being substantially of the width of said circular members, a flange formed upon each hub, said flanges being arranged in contacting relation, each of said hubs being formed with a recess, the recesses of the adjoined flanges forming sockets with said flanges, a stem arranged in each socket, being interposed between said flanges, bolts clamping said flanges against said stems, and a plurality of U shaped members being integrally formed terminally upon said stem, the arms of each U shaped member engaging the inner surfaces of said circular members at central points whereby said circular members are held separated.

In testimony whereof I affix my signature in presence of two witnesses.

JOSHUA M. JEFFERIS.

Witnesses:
E. J. S. CROTT,
N. P. SAWHEAD.

---

Copies of this patent may be obtained for five cents each, by addressing the " Commissioner of Patents, Washington, D. C."